United States Patent [19]

Müller et al.

[11] Patent Number: 4,597,481

[45] Date of Patent: Jul. 1, 1986

[54] HYDRODYNAMIC CONTROL COUPLING

[75] Inventors: Helmut Müller; Klaus Brosius, both of Heidenheim, Fed. Rep. of Germany

[73] Assignee: J. M. Voith GmbH, Heidenheim, Fed. Rep. of Germany

[21] Appl. No.: 476,846

[22] Filed: Mar. 18, 1983

[30] Foreign Application Priority Data

Mar. 27, 1982 [DE] Fed. Rep. of Germany ....... 3211337

[51] Int. Cl.$^4$ .................... F16D 33/16; F16D 33/18
[52] U.S. Cl. .................................. 192/58 A; 60/347; 192/82 T
[58] Field of Search ............ 192/58 A, 82 T; 60/347, 60/351, 357, 358, 359, 368

[56] References Cited

U.S. PATENT DOCUMENTS

| Re. 29,928 | 3/1979 | Bopp | 60/359 |
|---|---|---|---|
| 1,937,364 | 11/1983 | Sinclair | 60/359 |
| 1,962,972 | 6/1934 | Stock | 74/293 |
| 2,570,768 | 10/1951 | Clerk . | |
| 2,875,581 | 3/1959 | Kugel . | |
| 3,178,889 | 4/1965 | Nelden | 60/351 |
| 3,483,852 | 12/1969 | Newman et al. | 60/359 |
| 3,724,209 | 4/1973 | Fackenthal | 60/357 |
| 3,952,508 | 4/1976 | Bopp | 60/330 |
| 3,989,127 | 11/1976 | Staudenmaier et al. | 60/347 |
| 4,073,139 | 2/1978 | Armasow et al. . | |
| 4,201,050 | 5/1980 | Nixel | 60/357 |

FOREIGN PATENT DOCUMENTS

| 883987 | 7/1953 | Fed. Rep. of Germany . |
|---|---|---|
| 3013024 | 10/1981 | Fed. Rep. of Germany . |
| 921570 | 3/1963 | United Kingdom . |
| 1346677 | 2/1974 | United Kingdom . |

OTHER PUBLICATIONS

MTZ, 11 Nov. 1958, "Föttinger-Kupplung als Sicherheitsorgan bei Eisbrechern", p. 388.

Primary Examiner—Rodney H. Bonck
Attorney, Agent, or Firm—Ostrolenk, Faber, Gerb & Soffen

[57] ABSTRACT

The disclosure concerns a hydrodynamic control coupling with a primary drive vane wheel and a secondary driven vane wheel which together define a toroidal working chamber. Each vane wheel carries an array of vanes on its interior which extend toward the vanes of the other vane wheel. The vanes of the vane wheels are inclinded with respect to the axis of the coupling, yet each is oriented parallel to a respective radius of the coupling. Furthermore, the vanes on each of the vane wheels are inclined to extend toward the vanes on the other wheel. There is a working fluid inlet to the working chamber. A working fluid outlet from the working chamber is through the secondary, driven vane wheel and is via a plurality of bores extending tangentially toward the axis of the coupling. An overflow valve communicates with the outlet from the working chamber. Upon the rotary speed of the primary vane wheel increasing rapidly, the overflow valve reacts by opening more widely, reducing the filling level in the coupling. A temperature sensor may be connected with the overflow valve for operating the overflow valve so it is dependent upon the temperature sensed by the sensor. The temperature sensor may be in the engine cooling circuit of an engine, and the coupling may drive a cooling fan for that circuit. The valve will control the torque of the coupling for desired cooling rotation of the fan, depending upon the sensed temperature of the engine cooling circuit.

13 Claims, 3 Drawing Figures

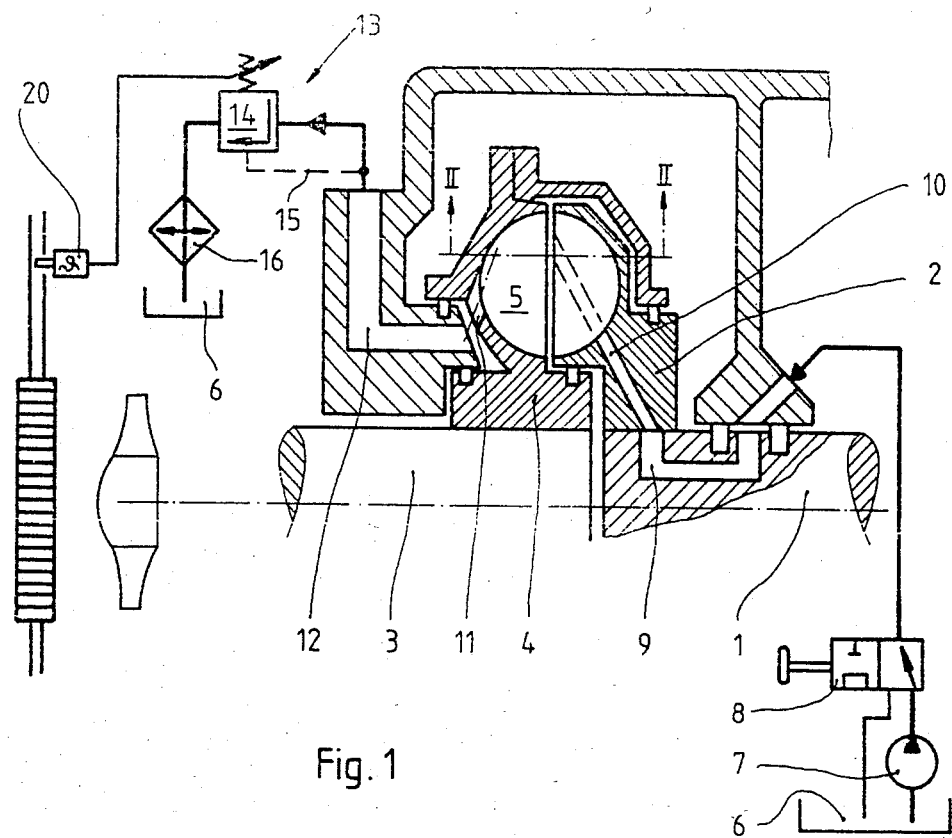
Fig. 1
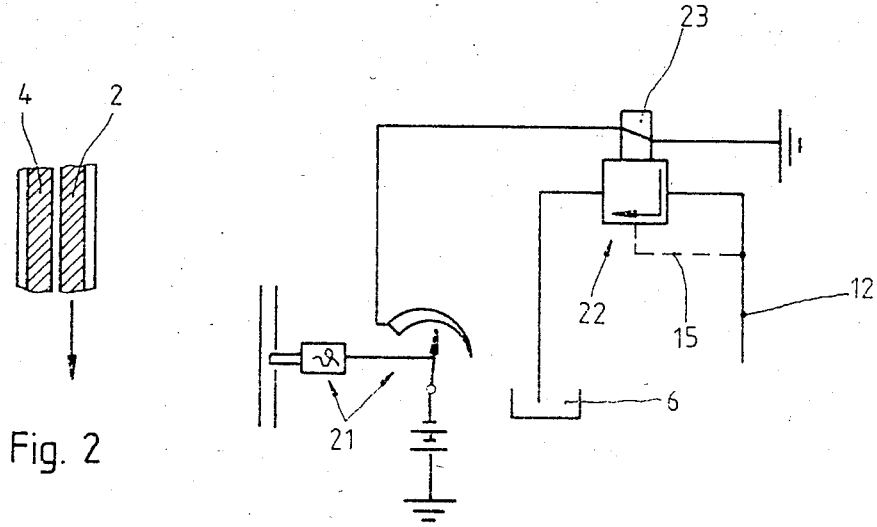
Fig. 2
Fig. 3

HYDRODYNAMIC CONTROL COUPLING

BACKGROUND OF THE INVENTION

The invention relates to a hydrodynamic control coupling. The coupling has a working chamber which is provided with an inlet and an outlet for the working medium or fluid. The working medium is conducted through stationary ducts. There is a cooling circuit for the working medium. A valve in the cooling circuit determines the filling level of the working chamber. Finally, there are vanes in the working chamber which are inclined at an angle relative to the axis of the coupling.

Control couplings of known prior design are frequently used in the drive of cooling fans, particularly in military tanks. In that case, it is very important that the coupling responds rapidly to external operating conditions. Above all, rapid filling and draining of the coupling are extremely important.

It is known to completely or partially drain the coupling when overloading occurs, i.e. either when the secondary rotary speed of the coupling is reduced by higher torque, or if the rotary input speed is increased while the filling level of the coupling remains unchanged. The torque which is to be transmitted then increases proportionally to the square of the rotary speed. In both cases, the coupling reacts with increased slip, which makes the flow inside the coupling spread out into radially inner areas of the working chamber. This is described in an article in the Journal "MTZ" No. 11/1958, page 388.

Austrian Pat. No. 224,411 shows a solution which enables the working chamber of the coupling to be drained via axial openings in the radially inner region of the coupling. German Pat. No. 883,987 also shows a coupling which enables the working fluid to escape into a radially inner region of the coupling when there is a high level of slip. Similarly, U.S. Pat. No. 2,570,768 discloses a coupling which has an outlet slit oriented tangentially to the wall of the secondary vane wheel. Although this makes rapid draining of the working chamber possible, the working fluid escapes into a header chamber inside the coupling. In such couplings with a header chamber, the working fluid flows back again into the working chamber when operating conditions change. It is therefore not possible to provide a device to control the coupling to provide a constant torque.

An embodiment of a coupling is also known, e.g. from German Allowed Application No. 26 14 476, in which the working fluid can flow away via the radially outer region of the toroidal working chamber. Due to the removal of working fluid in the outer region of the vanes in the chamber, this coupling serves particularly as overload protection when impacttype torque peaks occur. The working fluid which escapes out of the working chamber when overloading occurs is sprayed out of the coupling via an appropriate duct. A disadvantage in this case is the fact that the coupling cannot be satisfactorily regulated to a specific torque. It is instead better suited to restoring automatically a filling level which has been predetermined by a supply control device.

U.S. Pat. No. 3,178,889 discloses a coupling which has radially disposed pipe connections at the inner wall of the secondary wheel. A specific amount of working fluid flows out through these connections into a collecting chamber after the flow on the wall of the secondary wheel exceeds a certain thickness, when there is a high level of slip. The draining of the coupling is otherwise carried out via an extraction pipe.

Furthermore, the coupling known from German Published Application No. 3,013,024 is equipped with an external supply system for the working fluid, slanting vanes in the working chamber and a regulating device for constant torque. It is not possible with this coupling to obtain a very rapid reaction to sudden changes in the operating conditions.

In addition, the coupling for driving a fan known from German Published Application No. 2,612,133 has a substantially tangential extraction bore in the radially outer region of the secondary wheel. The working fluid is conducted through this bore to a control or regulating device. However, this responds to the centrifugal force produced by rotation and finally acts on a sliding cylindrical valve which directly influences the flow inside the coupling. A temperature measurement is made on the outside of the coupling itself. If the coupling is to be put in a housing and supplied by an external oil supply system, this construction cannot be used.

All of the embodiments described above have one disadvantage. They result in cumbersome couplings which are correspondingly expensive and require a relatively long period of time to establish a different filing level.

SUMMARY OF THE INVENTION

The object of the invention is to provide a fluid coupling of the kind described in the introduction hereof, which is as small, light, uncomplicated and therefore inexpensive as possible, but which nonetheless affords the advantage of rapid regulation to a level of torque which can be adjusted, but which is not dependent on slip.

The hydrodynamic control coupling of the invention includes a working chamber defined by and between two vane wheels, wherein the inwardly facing surface of each of the vane wheels carries vanes that project toward the other vane wheel. The vanes of each vane wheel extend toward the opposite vane wheel, are each in a plane that is parallel to a respective radius of the coupling and are also slanted in their orientation to be inclined at an angle to the axis of the coupling.

The working chamber has an inlet for pumped in working fluid or working medium and has an outlet for working fluid to leave the working chamber. The outlet from the working chamber at the second vane wheel is in the form of a plurality of tangentially oriented bores arrayed around the second or driven vane wheel of the coupling and the bores are oriented and extend in the flow direction out of the coupling. The bores begin at the inner side of the second vane wheel, the inner side being the side furthest from the first vane wheel. In a preferred embodiment, the tangential outlet bores point inward toward the axis of the coupling and open into an area at which the working fluid gathers. Ducts communicate between that open area and the below-described valve. The pressure in the tangential bores which acts in conjunction with the slanting vanes is directly related to the torque then being transmitted by the coupling.

The working fluid leaving the working chamber through the outlet passes through a cooling circuit and is then returned to the sump from which the working fluid is later pumped to the working chamber.

The filling level of the working chamber is controlled by a vlave in the outlet pathway, which valve may be in the pathway leading to the cooling circuit for the working fluid. The valve is operated to control the rate at which the working fluid exits from the working chamber. If the rotary speed of the primary vane wheel should increase suddenly, the valve reacts by opening wider, for reducing the filling level in the working chamber, but the torque transmitted through the coupling remains virtually constant.

Where the coupling controls the drive of a cooling fan for engine coolant, the valve may be controlled by a temperature sensor in the engine coolant, so that the rate of rotation of the fan is determined by the speed of the primary vane wheel and the level of filling of the working chamber.

Different embodiments of control valve are proposed. In one embodiment, the valve is a spring-loaded overflow valve which is loaded by the working medium pressure prevailing at the outlet from the tangential bores. The valve sensor causes the valve to reduce outlet flow from the working chamber when the temperature sensor senses an increase in the temperature, for example in the engine cooling circuit, whereby greater torque is applied to the fan which is to be driven by rotation of the coupling. In another embodiment, the temperature sensor operates to deliver an electric signal and the valve is electromagnetically controlled by the electric signal.

A coupling with slanting vanes on the vane wheels of the coupling creates a flow of working fluid in the working chamber of the coupling. The flow circulates at a particularly high speed at the inner wall and the flow lies closely against this inner wall. During this circulation, the working fluid fills the working chamber up to the end of the vane profile nearest to the hub, unlike couplings with straight, unslanted vane systems. Due to the tangential orientation of the outlet bores according to the invention, draining of the coupling is greatly enhanced and it occurs very rapidly.

In addition, filling of the coupling also takes only a relatively short time. A plurality of inlet ducts open into the center of the working chamber and thus into the region where the pressure is lowest, the so-called core ring. The in-flow of the working fluid is enhanced by the effect of centrifugal force in the supply duct which is rotating with the coupling.

The working fluid leaving the working chamber via tangential bores is under a certain amount of over-pressure, depending on the rotary speed of the coupling and the filling level. This is transmitted from the oulet bores via stationary duts to a regulating device or valve which is attached to the housing and therefore does not rotate with the coupling. The inventor hereof realized that the removal of working fluid from a coupling with slanting vanes only provides a pressure measurement value which can be used as a measure of the amount of torque being transmitted, when the outflow is effected via tangential bores extending in the flow direction, and that this measurement is not dependent on the rotary speed and the filling level. The over-pressure acting on the regulating device can then be used as a reference for setting different levels of torque.

A regulating device is known from German Published Application No. 30 13 024. It consists substantially of a spring-loaded overflow valve. By prestressing the valve spring to various extents, the pressure in front of the overflow valve and thus the pressure at the outlet from the coupling and thereby the amount of torque transmitted can be adjusted.

Slanting vanes produce a more intensive flow through the working chamber than would straight vanes. The so-called K value of the coupling is also increased thereby. The coupling can therefore be built with smaller dimensions for a given transmission performance. Because the working fluid removed from the working chamber of the coupling is conducted via a stationary regulating device into a collecting container, from which it is supplied to the coupling again after appropriate intermediate cooling, the whole system is free from regulating oscillations. This is particularly advantageous with the small dimensions which can be achieved and the smaller amount of oil which is therefore required in the coupling.

Since the coupling is to be used especially for driving a fan for a vehicle engine cooling circuit, in a further development of the invention, the temperature of the cooling medium involved, which is generally water, can be monitored. For this, a temperature indicator is arranged in the cooling water circuit. It may, for example, vary the prestressing of the spring of the spring-loaded overflow valve in the regulating device in a direct mechanical way. An electrical temperature indicator may also be used to advantage. In this case, an electromagnet is preferably used at the overflow valve of the regulating device. This exerts different amounts of counter-force on the valve body of the overflow valve. To achieve different pressures or levels of torque, all that is required is for different voltages to be supplied to the magnet, for example.

Since the coupling is under internal pressure and is regulated via a pressure regulating system, sliding sealing elements, such as piston rings, for example, are preferably used to seal the rotating parts from each other and from the housing.

The advantage of the coupling lies above all in its compact construction and self-regulating function without external intervention. For example, it can keep the rotary speed of a cooling fan low and constant even when the rotary speed of the engine which drives the fan increases suddenly. This low speed is maintained provided that the cooling water is still at a low temperature. The output of the drive which is not required for the fan is available for the traction of the vehicle.

The invention is described in more detail with reference to the accompanying drawings.

BRIEF DESCRIPTION OF THE DRAWINGS

FIG. 1 is a longitudinal section through a coupling according to the invention.

FIG. 2 is a partial section through the vane wheels along the line II—II in FIG. 1.

FIG. 3 is a schematic illustration of the overflow valve of the coupling, in the form of an electro-hydraulic pressure-regulating valve.

DESCRIPTION OF A PREFERRED EMBODIMENT

The coupling shown in FIG. 1 has an input shaft 1 with a primary or drive vane wheel 2, and an output shaft 3 with a secondary or driven vane wheel 4. The output shaft 3 drives the fan impeller. The vane wheels 2 and 4 are shaped to together define an annular, toroidal working chamber 5 between them and each wheel supports vanes extending into the chamber toward the vanes of the other wheel. The filling of the working chamber 5 is effected from a sump 6 by means of a pump 7, optionally via a switching-on valve 8 and supply ducts 9, and the flow is into ducts 10 which open directly into the center of the working chamber 5.

The secondary vane wheel 4 has a plurality of outlet bores 11 arrayed around itself, preferably at equal intervals, which start at the inner periphery of the vane wheel 4 and are located furthest from the vanes of vane wheel 2. The bores 11 are disposed tangentially of the round wall of the chamber and they extend at an angle inward toward the axis of the coupling. The radially inner ends of the bores 11 open into a free annular space defined at the side of the vane wheel 4. Ducts 12 located in a stationary housing next to the vane wheel 4 lead from the annular space to the pressure-regulating device 13. This pressure-regulating device comprises an overflow valve 14 having a movable valve body. The pressure in the ducts 12 and the bores 11 of the secondary vane wheel 4 act on the movable valve body in the direction "Open", which is shown symbolically by the control line 15. The working fluid leaving the overflow valve 14 passes back into the sump 6, optionally after flowing through a cooler 16.

The working chamber 5 of the coupling is continuously charged with working fluid by the pump 7. The working chamber of the coupling is sealed off with regard to pressure-dependent regulation. There is a seal between the two vane wheels 2 and 4, as well as between the vane wheels and the stationary housing. The secondary vane wheel 4 engages around the primary vane wheel 2 in the form of a casing.

It is known that the slanting orientation of the vanes of the vane wheels causes a particularly intensive flow through the working chamber. Despite this, in the center of the working chamber 5, a low pressure zone forms so that the supply of working fluid into this zone is particularly favorable. Due to the continuous pressure connection between the working chamber 5 and the overflow valve 14 via the bores 11 and ducts 12, during normal operation of the coupling, there is always a certain amount of working fluid leaving via the overflow valve. The pressure prevailing here is proportional to the amount of torque being transmitted by the coupling at the time. However, the amount of toque being transmitted is again proportional to the square of the rotary speed of the secondary vane wheel 4, when it is driving a cooling fan impeller, for example.

The primary vane wheel 2 is generally driven at a speed proportional to the rotary speed of the engine. If the speed of the vane wheel is suddenly increased, this represents momentary overloading of the coupling. The secondary vane wheel 4 is then still rotating at a lower speed, so that a high level of slip occurs. The suddenly increased rotary speed applied by the primary vane wheel 2 leads to higher pressure at the tangential bores 11 and thus also at the overflow valve 14. The valve 14 reacts by more intensive or rapid draining of working fluid out of the working chamber, so that the filling level is reduced and the torque of the secondary vane wheel 4 is thus kept constant despite the higher primary vane wheel rotary speed.

In a further development of the invention the response of the overflow valve 14 is influenced by a temperature-dependent impulse. A temperature sensor 20 is arranged, for example, in the water flow circuit of the engine cooling water of the engine which drives the shaft 1, for example. According to the temperature of the cooling water, it occasions different prestressing of the valve spring at the overflow valve 14. The following is achieved. If, for example, the cooling water is still relatively cool, then there is no necessity to allow the fan to rotate faster when there is a sudden increase in the rotary speed and output of the engine. The temperature sensor ensures that there is low prestressing at the overflow valve 14 so that this opens at a low pressure and thus drains the coupling at a low level of torque. The fan therefore rotates only at a low rotary speed. Nearly all of the engine output is then available for the traction of the vehicle. If the cooling water heats up after some time, then the spring of the overflow valve 14 is more strongly stressed by the temperature sensor so that a higher pressure prevails at the outlet bores 11 and the coupling is forced to transmit a higher level of torque, so that the rotary speed of the cooling fan increases. This regulating process is accomplished irrespective of the primary rotary speed. It is therefore possible for the fan to be driven with a completely full working chamber when the cooling water is hot, even if the engine is running at a reduced rotary speed again. The fan may be dimensioned so that it is possible to have an adequate cooling effect even when the engine is running at idling speed, alternatively intermediate gearing, which increases the rotary speed of the fan for adequate cooling at idling speed, is provided between the coupling and the fan. After-cooling is effected automatically without a build-up of heat in the engine. The disadvantages of a known cooling fan which is driven directly dependent on engine rotary speed are avoided. The regulating process proceeds automatically and improves the efficiency of the drive unit.

FIG. 2 shows a partial cylindrical section through the vane system of the coupling. The slanting setting of the vanes can be seen. They project from the interior wall of their respective vane wheel almost into contact with the vanes of the other vane wheel, as can be seen in FIG. 1. They are, however, slanted in orientation and are inclined with respect to the axis of the shafts 1, 3 and of the coupling, as shown in FIG. 2. Although the vanes are slanted as described, each is also parallel to a respective radius of the coupling. Finally, the vanes on the two vane wheels are inclined in opposite directions, and at equal supplementary angles, whereby the opposite vanes extend toward each other and are all in planes that would intersect in a line that intersects the axis of the coupling. The amount of torque which can be transmitted in the direction of the arrow is higher with the slanted vane coupling than with a coupling with axis-parallel vanes.

As a variation from the embodiment shown in FIG. 1, FIG. 3 shows an electro-hydraulic pressure-regulating valve 22 which is equipped with a magnet 23 which can be adjusted to different amounts of force. The magnet 23 converts the signals generated by an electrical temperature indicator 21 disposed in the circuit of the engine cooling water into different amounts of magnetic force on the valve body of the pressure-regulating valve 22.

Although the present invention has been described in connection with a plurality of preferred embodiments thereof, many variations and modifications will now become apparent to those skilled in the art. It is preferred, therefore, that the present invention be limited not by the specific disclosure herein, but only by the appended claims.

What is claimed is:

1. A hydrodynamic control coupling comprising a drive annular vane wheel and a driven annular vane wheel having a common axis, a respective shaft supporting each of the vane wheels for rotation around the common axis; the vane wheels cooperating for defining a toroidal working chamber between them;

each vane wheel carrying respective vanes in the working chamber which extend toward the vanes of the other vane wheel for enabling the driven vane wheel to be driven by receiving torque from the drive vane wheel through the flow of a working fluid in a flow direction within the working chamber; the vanes of the vane wheels all being in respective planes which include respective radii from said axis, and being inclined at an angle with respect to the axis of the coupling for intensifying flow of working fluid in the working chamber;

a sump for working fluid;

an inlet to the working chamber for working fluid from said sump to be delivered to the working chamber;

an outlet from the working chamber for outflow of working fluid from the working chamber to said sump, the working chamber outlet comprising a plurality of tangentially oriented bores formed in the driven vane wheel and extending in the flow direction inwardly toward the axis for acting with the inclined vanes to provide a pressure in the working chamber outlet which indicates the torque being received from the drive vane wheel; and a valve to which the outlet is connected for determining the filling level of the working chamber, the valve operating in response to pressure in the working chamber oulet to control the rate at which working fluid leaves the working chamber, thereby controlling the torque being received.

2. The coupling of claim 1, further comprising a cooling circuit for cooling the working fluid, the cooling circuit being connected with the oulet from the working chamber; the valve being provided in the cooling circuit for determining the filling level of the working chamber.

3. The coupling of claim 2, further comprising means for delivering working fluid from the sump to the working chamber inlet; the cooling circuit being located for delivering working fluid to the sump.

4. The coupling of claim 1, wherein the respective vanes in the two vane wheels are inclined in opposite directions with respect to the axis of the coupling.

5. The coupling of claim 1, wherein the valve comprises a spring-loaded, overflow valve, which is connected to the working chamber outlet to be loaded with working fluid pressure prevailing at the outlet from the tangential bores.

6. The coupling of claim 1, wherein the valve is adapted for being set at different selected response pressures for controlling outflow of working fluid from the outlet.

7. The coupling of claim 6, further comprising a temperature sensor connected with the valve for moving the valve to different response pressures dependent upon the temperature sensed by the temperature sensor.

8. The coupling of claim 7, further comprising a portion of the cooling circuit of an engine, and the temperature sensor being disposed in the coolong circuit of the engine, for sensing the temperature of a cooling medium in the cooling circuit of the engine for causing the valve to react thereto.

9. The coupling of claim 8, further comprising a cooling fan connected to be driven by the driven vane wheel, and the cooling fan being adapted to blow to cool the cooling circuit.

10. A coupling as in claim 1, wherein said inlet for delivering working fluid to the working chamber includes a plurality of inlet ducts in said drive vane wheel, which extend generally from a portion of said drive vane wheel near said axis and away from said driven vane wheel, to said working chamber, whereby centrifugal force due to rotation of said drive vane wheel further intensifies flow of working fluid in said flow direction in the working chamber.

11. Apparatus as in claim 14, wherein said inlet ducts extend in a direction for delivery of working fluid substantially toward the center of the working chamber.

12. A hydrodynamic control coupling comprising a drive annular vane wheel and a driven annular vane wheel having a common axis, a respective shaft supporting each of the vane wheels for rotation around the common axis; the vane wheels cooperating for defining a toroidal working chamber between them;

each vane wheel carrying respective vanes in the working chamber which extend toward the vanes of the other vane wheel for enabling the driven vane wheel to be driven by receiving torque from the drive vane wheel through the flow of a working fluid in a flow direction within the working chamber; the vanes of the vane wheels all being inclined at an angle with respect to the axis of the coupling for intensifying flow of working fluid in the working chamber;

an inlet to the working chamber for working fluid to be delivered to the working chamber;

an outlet from the working chamber for outflow of working fluid from the working chamber, the working chamber outlet comprising a plurality of tangentially oriented bores formed in the driven vane wheel and extending in the flow direction for acting with the inclined vanes to provide a pressure in the working chamber outlet which indicates the torque being received from the drive vane wheel; and a valve to which the outlet is connected for determining the filling level of the working chamber, the valve operating in response to pressure in the working chamber outlet to control the rate at which working fluid leaves the working chamber, thereby controlling the torque being received; the valve being adapted for being set at different selected response pressures for controlling outflow of working fluid from the outlet;

a temperature sensor connected with the valve for moving the valve to different response pressures dependent upon the temperature sensed by the temperature sensor;

wherein the temperature sensor is so connected with the valve that when the temperature sensor senses low temperature, the closing force upon the working chamber outlet exerted by the valve is reduced, and the closing force exerted by the valve on the outlet from the working chamber increases as the temperature sensor senses increasing temperatures.

13. A hydrodynamic control coupling comprising a drive annular vane wheel and a driven annular vane wheel having a common axis, a respective shaft supporting each of the vane wheels for rotation around the common axis; the vane wheels cooperating for defining a toroidal working chamber between them;

each vane wheel carrying respective vanes in the working chamber which extend toward the vanes of the other vane wheel for enabling the driven vane wheel to be driven by receiving torque from the drive vane wheel through the flow of a working fluid in a flow direction within the working chamber; the vanes of the vane wheels all being inclined at an angle with respect to the axis of the coupling for intensifying flow or working fluid in the working chamber;

an inlet to the working chamber for working fluid to be delivered to the working chamber;

an outlet from the working chamber for outflow of working fluid from the working chamber, the working chamber outlet comprising a plurality of tangentially oriented bores formed in the driven vane wheel and extending in the flow direction for acting with the inclined vanes to provide a pressure in the working chamber outlet which indicates the torque being received from the drive vane wheel; and a valve to which the outlet is connected for determining the filling level of the working chamber, the valve operating in response to pressure in the working chamber outlet to control the rate at which working fluid leaves the working chamber, thereby controlling the torque being received; the valve being adapted for being set at different selected response pressures for controlling outflow of working fluid from the outlet;

wherein the valve is an electro-hydraulic pressure-regulating valve, including a valve body and an electromagnet which is adapted for moving the valve body to apply selected closing force to the outlet from the working chamber dependent upon the electrical signal provided to the electromagnet; a temperature sensor, including means for converting sensed temperature into an electric signal, and being connected with the electromagnet of the electrohydraulic pressure-regulating valve, and the temperature sensor being responsive to sensed temperature for providing a different selected level of electrical energy to the electromagnet depending upon the sensed temperature, whereby the valve will close the outlet to a varying extent depending upon the temperature sensed by the temperature sensor.

* * * * *